(12) United States Patent
Lin

(10) Patent No.: US 6,338,681 B1
(45) Date of Patent: Jan. 15, 2002

(54) MAGNETIC TRANSMISSION STRUCTURE

(75) Inventor: Yu Tse Lin, Taipei (TW)

(73) Assignee: Aurise Inc., Yun-Lin Hsien (TW)

( * ) Notice: Subject to any disclaimer, the term of this patent is extended or adjusted under 35 U.S.C. 154(b) by 53 days.

(21) Appl. No.: 09/590,699

(22) Filed: Jun. 9, 2000

(51) Int. Cl.[7] .............................. F16D 27/01; G01C 5/00
(52) U.S. Cl. ......................... 464/29; 464/185; 33/290; 33/DIG. 1
(58) Field of Search ..................... 464/29, 185; 33/281, 33/282, 285, 286, 290, DIG. 1, DIG. 21

(56) References Cited

U.S. PATENT DOCUMENTS

| | | | | |
|---|---|---|---|---|
| 3,771,876 A | * | 11/1973 | Ljungdahl et al. | 356/138 |
| 4,379,624 A | * | 4/1983 | Miller et al. | 350/486 |
| 4,512,626 A | * | 4/1985 | Kamiya et al. | 350/6.8 |
| 4,645,432 A | * | 2/1987 | Tata | 417/420 |
| 4,751,782 A | * | 6/1988 | Ammann | 33/291 |
| 4,827,642 A | * | 5/1989 | Chatten | 40/426 |
| 5,533,268 A | * | 7/1996 | Keightley | 33/290 |
| 5,552,886 A | * | 9/1996 | Kitajima et al. | 33/291 |
| 5,619,802 A | * | 4/1997 | Rando et al. | 33/291 |
| 5,770,795 A | * | 6/1998 | Behar et al. | 73/54.23 |
| 6,035,540 A | * | 3/2000 | Wu et al. | 33/286 |

* cited by examiner

Primary Examiner—Lynne H. Browne
Assistant Examiner—Krnn Thompson
(74) Attorney, Agent, or Firm—A & J

(57) ABSTRACT

A magnetic transmission structure for a laser level includes a driving member provided with two opposite first chambers in each of which is fitted a magnet, a driven member provided with two opposite second chambers arranged in alignment with the first opposite chambers, each of the second chamber being provided with a magnet, and a motor having an output axle drivingly connected with an intermediate portion of the driving member, whereby the driven member will be rotated with the driving member without direct interconnecting members when the motor is turned on.

6 Claims, 5 Drawing Sheets

MAGNETIC TRANSMISSION STRUCTURE

BACKGROUND OF THE INVENTION

1. Field of the Invention

This invention is related to a magnetic transmission structure and in particular to one wherein the driven member will be rotated with the driving member without direct interconnecting members.

2. Description of the Prior Art

The laser module of the conventional laser level is generally driven by means of a belt or gears, or directly driven by a motor. However, the driving shaft of the motor is eccentric with the center line of the laser module when they are drivingly connected by a belt or gears, i.e. the shaft of the motor cannot be arranged in alignment with the center line of the laser module, thereby resulting in vibration to the laser module and therefore influencing the accuracy of the laser beam. In addition, the motor must be mounted at one side of the laser level and cannot be installed at the center of the laser level, so that the stability of the laser level will be influenced when the motor is turning. Hence, it is proposed to connect the laser module directly with the output shaft of the motor, so that the motor can be mounted at the center of the laser level so as to increase the stability thereof Nevertheless, the output shaft of the motor is easily engaged with the bearing once the laser level is subjected to vibration and furthermore, the vibration of the motor will be transmitted to the laser module thereby influencing the accuracy thereof.

Furthermore, carbon brushes of the motor will be worn out in a short period of time at high speed so that it is necessary to replace the carbon brushes regularly in order to keep the conductivity. However, the laser module must be re-adjusted in position whenever the carbon brushes are replaced thereby causing much inconvenience in use.

Therefore, it is an object of the present invention to provide a magnetic transmission structure which can obviate and mitigate the above-mentioned drawbacks.

SUMMARY OF THE INVENTION

This invention is related to a magnetic transmission structure for laser levels.

It is the primary object of the present invention to provide a magnetic transmission structure for laser levels wherein the driven member can be rotated with the driving member without direct interconnecting members.

It is another object of the present invention to provide a magnetic transmission structure for laser levels which can provide accurate measurements.

It is a further object of the present invention to provide a magnetic transmission structure for laser levels which is durable in use.

According to a preferred embodiment of the present invention, a magnetic transmission structure for a laser level includes a driving member provided with two opposite first chambers in each of which is fitted a magnet, a driven member provided with two opposite second chambers arranged in alignment with the first opposite chambers, each of the second chamber being provided with a magnet, and a motor having an output axle drivingly connected with an intermediate portion of the driving member.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
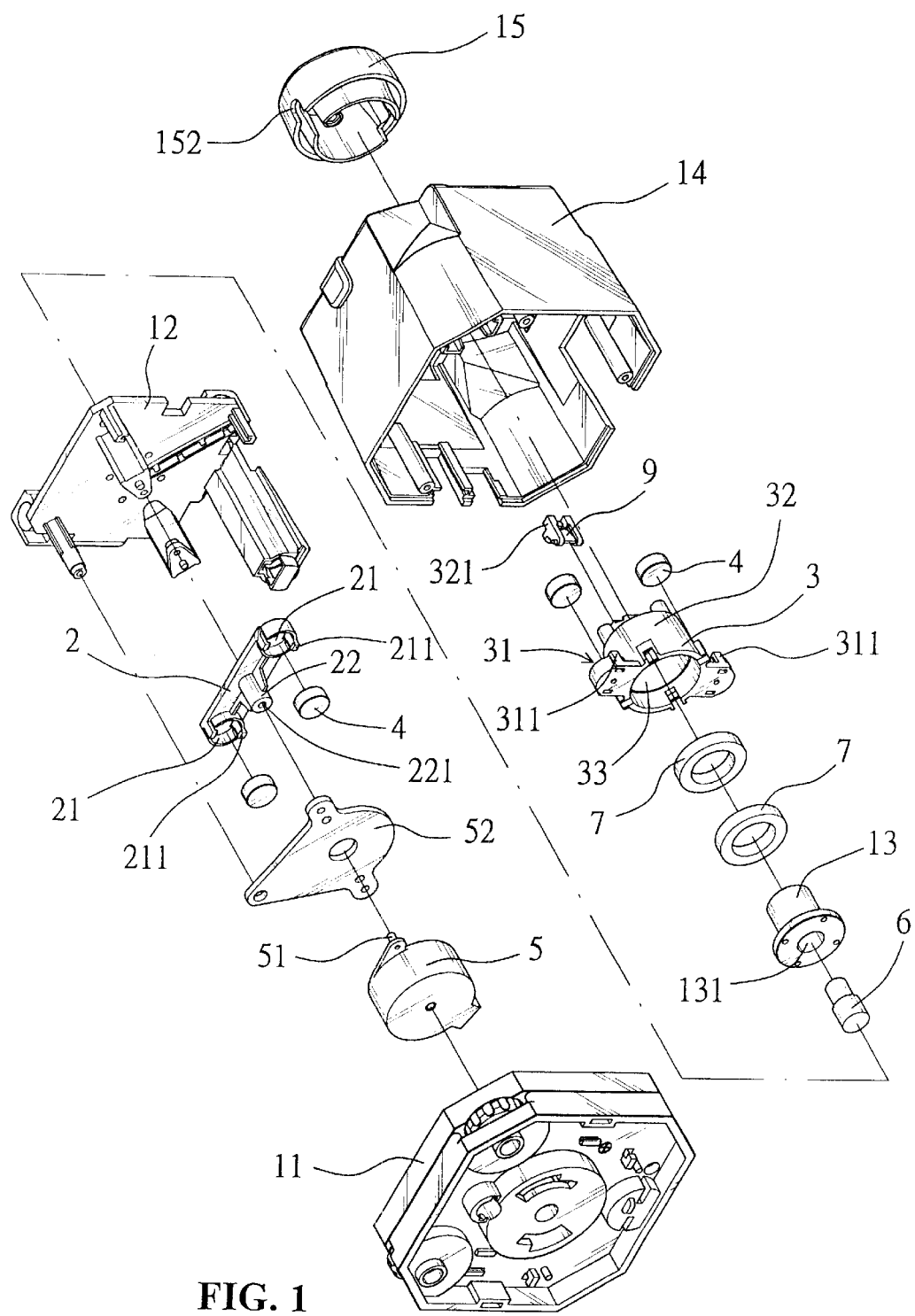
FIG. 1 is an exploded view of the present invention.
Figure 2:
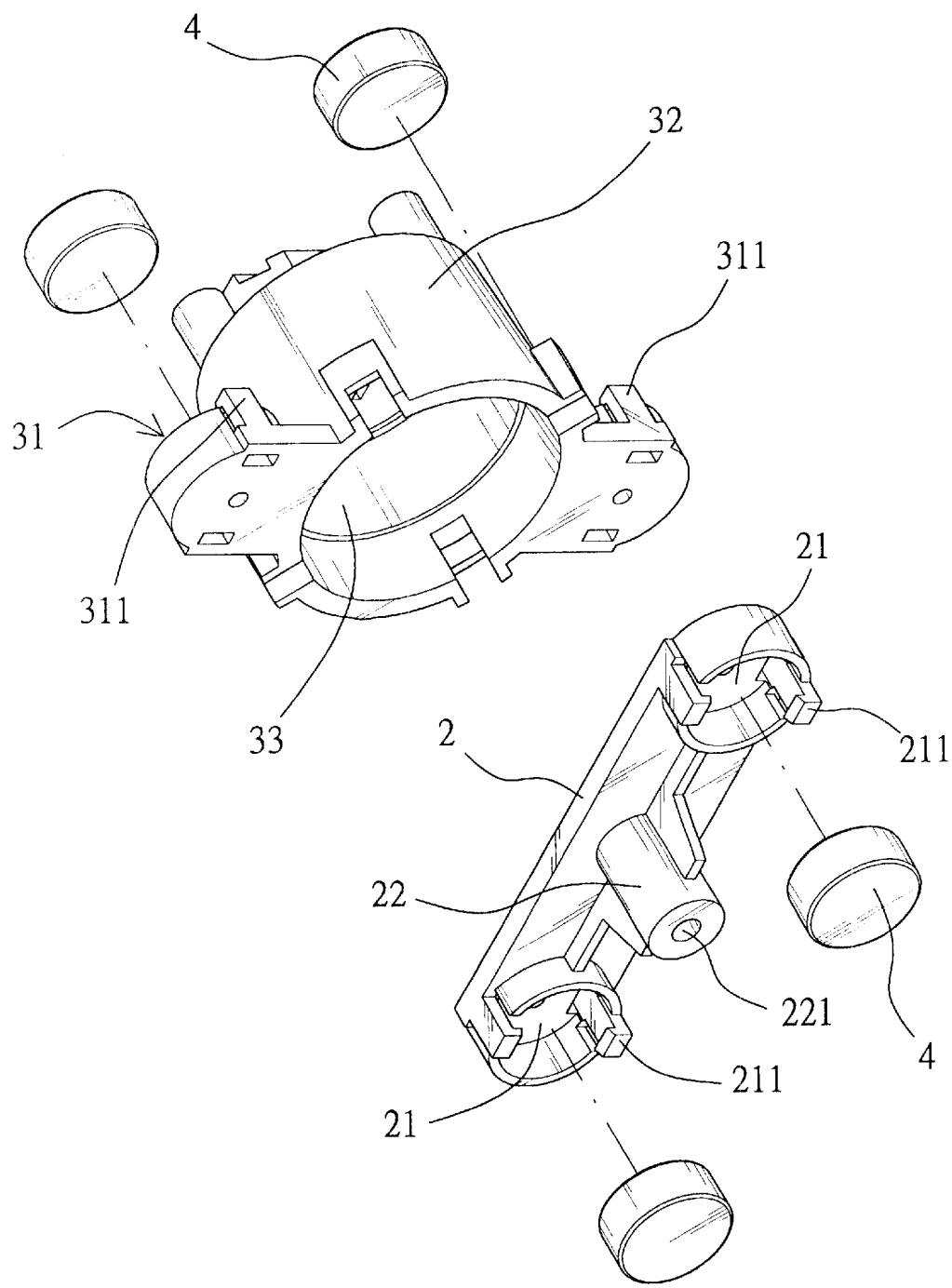
FIG. 2 illustrates the relationship between the driving member and the driven member.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
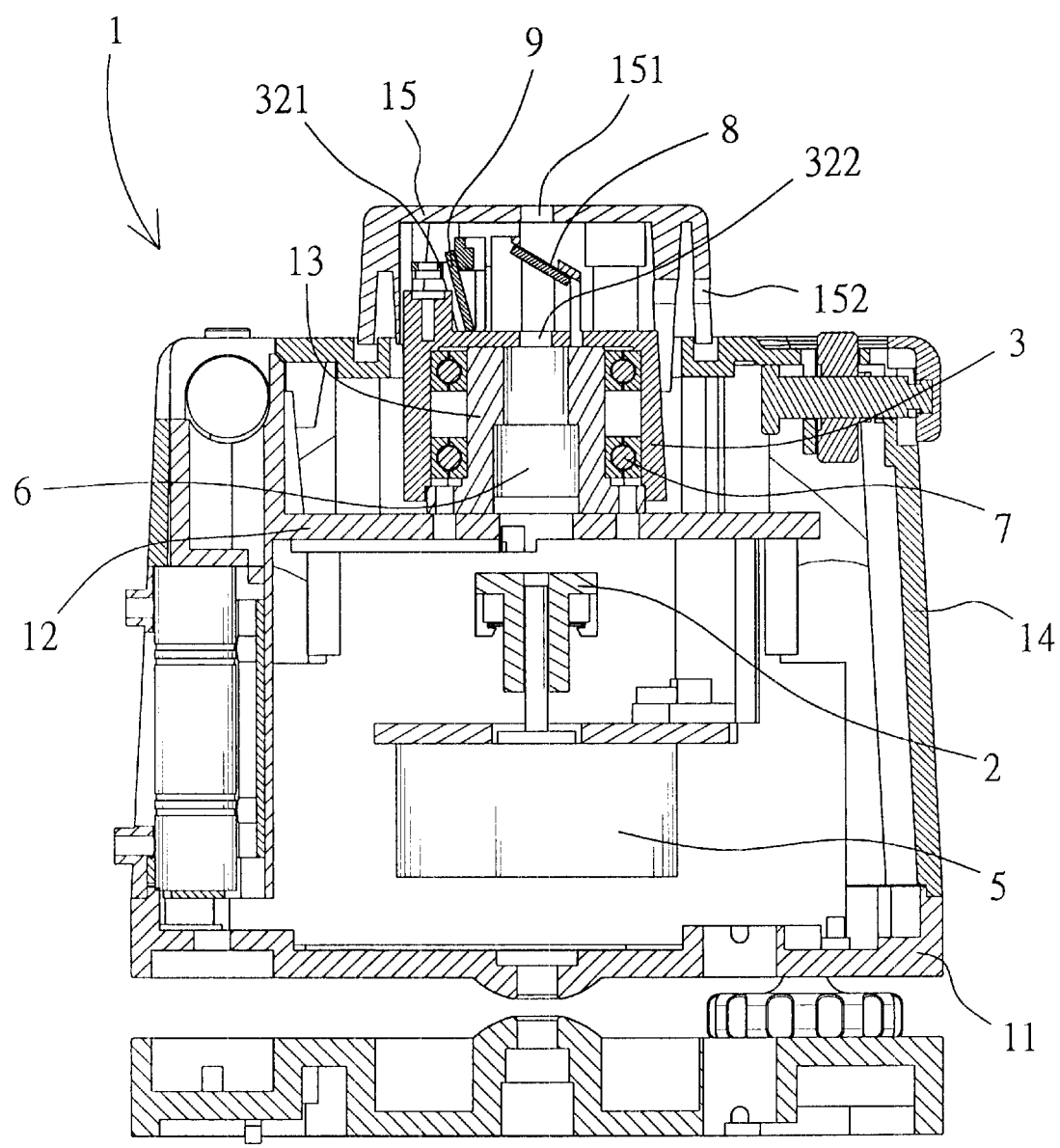
FIG. 3 is a sectional view of the present invention.
Figure 4:
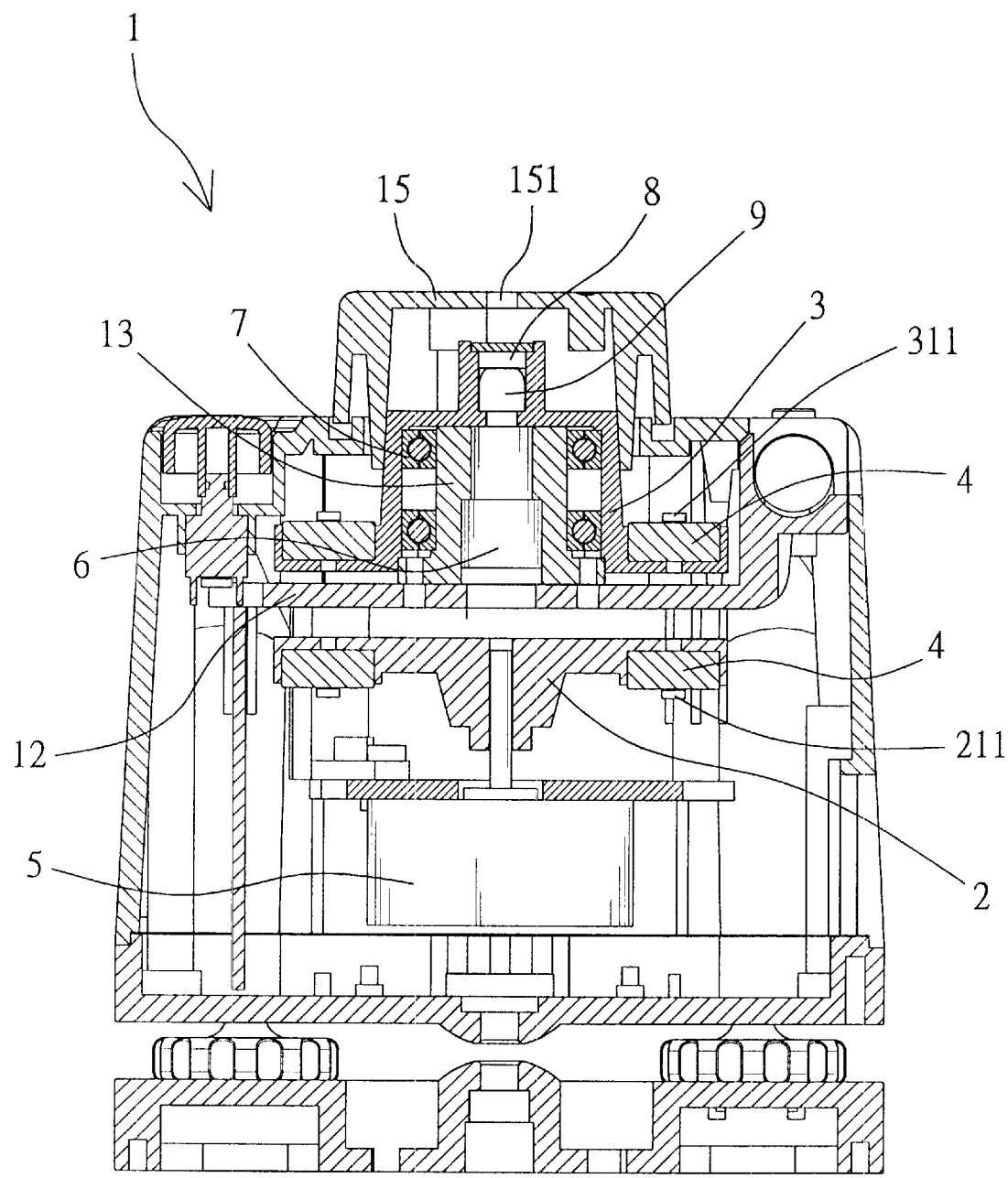
FIG. 4 is another sectional view of the present invention.

With reference to the drawings and in particular to FIG. 1 thereof, the magnetic transmission structure according to the present invention generally comprises a driving member 2, a driven member 3, a motor 5, a fixing plate 52, a frame 12, a base 11, a sleeve 13, two bearings 7 and a housing 14. The driving member 2 has a bottom formed with two opposite chambers 21 and a cylindrical portion 22 at the intermediate position thereof. The cylindrical portion 22 is formed with a center hole 221. The driven member 3 has a top formed with two opposite chambers 31 and a tubular portion 32 at the intermediate position thereof The tubular portion 32 has a cylindrical recess 33 and a through hole 322 at the top (see FIG. 3). The chambers 21 of the driving member 2 are each provided with two hooks 211 for retaining a magnet 4 therein. Similarly, the chambers 31 of the driven member 3 are each provided with two hooks 311 for keeping a magnet 4 therein.

The output axle 51 of the motor 5 is inserted into the center hole 221 of the driving member 2. The motor 5 is fastened on the fixing plate 52 which is fixedly mounted on the frame 12 which is in turn installed on the base 11. The sleeve 13 is fixedly mounted on the center portion of the frame 12 by screws (not shown) and has a through hole 131 in which is fitted a laser module 6. The two bearings 7 are fitted on the sleeve 13 and the driven member 3 is in turn fitted on the two bearings 7 so that the driven member 3 can be freely rotated with respect to the sleeve 13. A lens 8 (see FIG. 3) is mounted on the top of the tubular portion 32 of the driven member 3. An adjust seat 321 on which is mounted a reflective mirror 9 is arranged beside the lens 8. The housing 14 has an opening at the top so that when the housing 14 is disposed on the base 11, the upper portion of the driven member 3 will protrude out of the housing 14. The cap 15 is engaged with the upper portion of the driven member 3 and has a center hole 151 for the passage of laser beam. The lateral side of the cap 15 is formed with a notch 152.

As the magnets 4 of the driven member 3 will be attracted by the magnets 4 of the driving member 2, the driven member 3 will be rotated in unison with the driving member 3 when the driving member 2 is driven by the motor 5. The laser module 6 is kept within the through hole 131 of the sleeve 13 and will emit laser beam through the sleeve 13 and the center through hole 322 of the driven member 3 to the lens 8 on the tubular portion 32 of the driven member 3. The laser beam will pass through lens 8 and the center hole 151 of the cap 15 on one hand, and will be refracted by the lens 8 to the reflective mirror 9 on the other hand which will in turn reflect the laser beam to pass through the notch 152 of the cap 5. The angular position of the reflective mirror 9 can be changed by adjusting the adjust seat 321. When the driven member 3 is rotated, there will be a horizontal line on an object being measured.

As there is no direct connection between the driving and driven members 2 and 3, the laser module on the driven member 3 will not be influenced by the vibration of the motor 5 and can provide accurate measurements. In addition, as the loading on the output axle 151 of the motor 5 is small, the output axle 151 will not be engaged with the bearings 7 thereby prolonging the service life of the laser level. Furthermore, the laser module 6 is kept at a fixed position, no maintenance is required for the wear of the carbon brush. Moreover, the motor 5 will keep on rotating even if the cap 15 and/or the driven member 3 are blocked from rotating, thus preventing the motor 5 from overloading.

Figure 5:
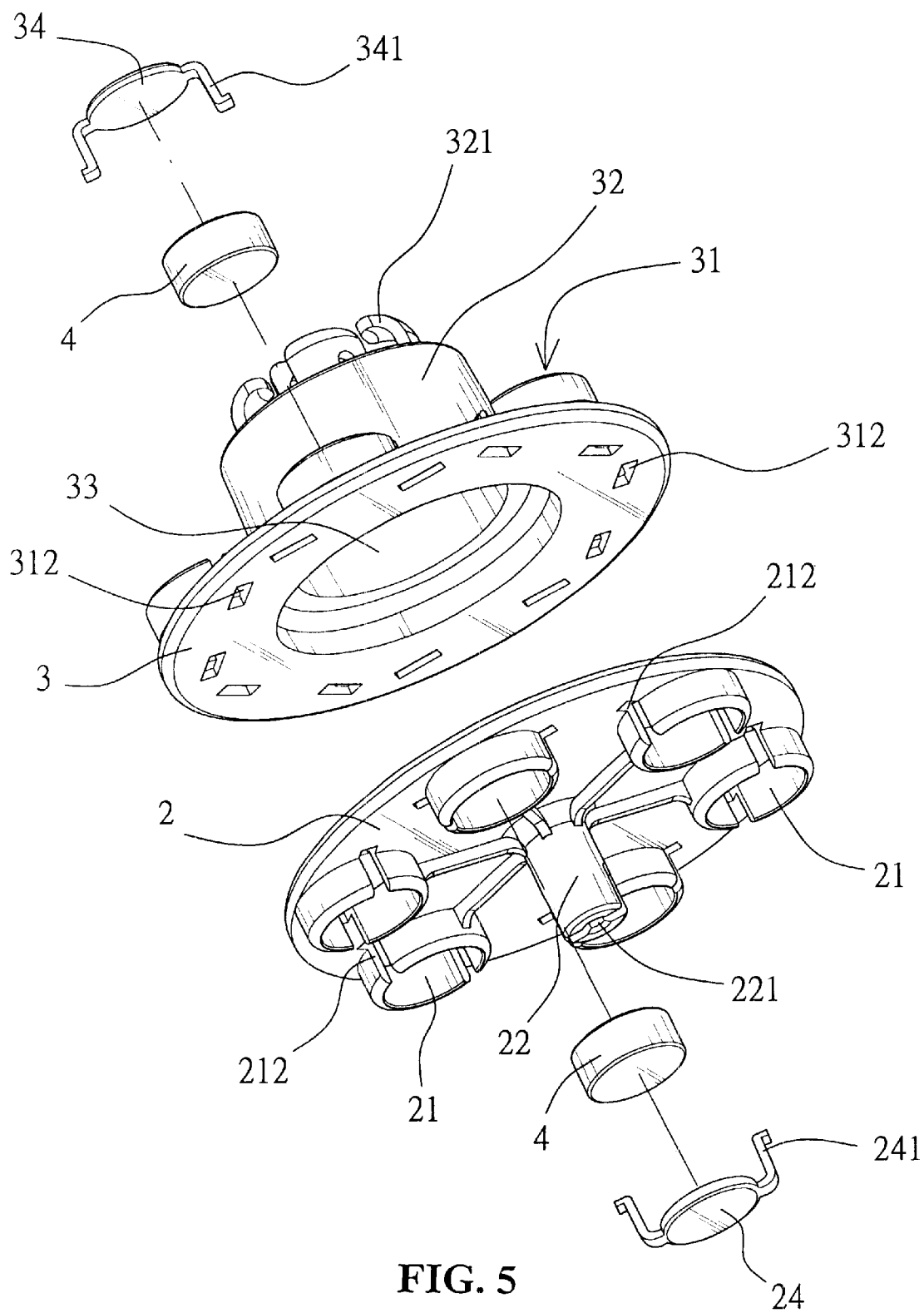
FIG. 5 is an exploded view of another preferred embodiment of the present invention.

FIG. 5 illustrates another preferred embodiment of the present invention. As shown, the driving member 2 and the driven member 3 are each formed with a plurality of chambers 21 and 31 for enhancing the driving connection therebetween. Furthermore, each of the chambers 21 and 31 is provided with two slots 212 and 312 configured to engage with hooks 241 and 341 of retainers 24 and 34 so as to keep the magnets 4 therein.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A magnetic transmission structure for a laser level comprising:

a driving member provided with two opposite first chambers in each of which is fitted a magnet;

a driven member provided with two opposite second chambers arranged in alignment with said first opposite chambers, each of said second chamber being provided with a magnet; and a motor having an output axle drivingly connected with an intermediate portion of said driving member;

whereby said driven member will be rotated with said driving member without direct interconnecting members when said motor is turned on.

2. The magnetic transmission structure for a laser level as claimed in claim 1, wherein said chambers of said driving and driven member are provided with two opposite hooks.

3. The magnetic transmission structure for a laser level as claimed in claim 1, wherein said chambers of said driving and driven members are formed with slots engaged with hooks of retainers.

4. The magnetic transmission structure for a laser level as claimed in claim 1, wherein said driving and driven members are formed with a plurality of chambers.

5. The magnetic transmission structure for a laser level as claimed in claim 1, wherein said driving member is formed with a tubular portion having a cylindrical recess and a through hole, said tubular portion having a top on which is mounted a lens, an adjust seat and a reflective mirror mounted on said adjust seat.

6. The magnetic transmission structure for a laser level as claimed in claim 1, wherein said driven member has two bearings fitted on said sleeve so as to enable said driven member to be freely rotated with respect to said sleeve.

* * * * *

UNITED STATES PATENT AND TRADEMARK OFFICE
CERTIFICATE OF CORRECTION

PATENT NO. : 6,338,681 B1
DATED : January 15, 2002
INVENTOR(S) : Lin

It is certified that error appears in the above-identified patent and that said Letters Patent is hereby corrected as shown below:

<u>Title page,</u>
Item [*] Notice: delete the phrase "by 53 days" and insert -- by 56 days --

Signed and Sealed this

Eighteenth Day of May, 2004

JON W. DUDAS
*Acting Director of the United States Patent and Trademark Office*